US010938504B2

United States Patent
Rico Alvarino et al.

(10) Patent No.: US 10,938,504 B2
(45) Date of Patent: Mar. 2, 2021

(54) ENHANCEMENTS TO MODULATION ORDER DETERMINATION

(71) Applicant: QUALCOMM Incorporated, San Diego, CA (US)

(72) Inventors: Alberto Rico Alvarino, San Diego, CA (US); Jae Ho Ryu, San Diego, CA (US); Peter Gaal, San Diego, CA (US); Supratik Bhattacharjee, San Diego, CA (US); Aamod Dinkar Khandekar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 265 days.

(21) Appl. No.: 15/970,312

(22) Filed: May 3, 2018

(65) Prior Publication Data
US 2018/0323902 A1 Nov. 8, 2018

Related U.S. Application Data

(60) Provisional application No. 62/502,570, filed on May 5, 2017.

(51) Int. Cl.
*H04L 1/00* (2006.01)
*H04W 72/04* (2009.01)
(Continued)

(52) U.S. Cl.
CPC .......... *H04L 1/0004* (2013.01); *H04L 1/0025* (2013.01); *H04L 1/0031* (2013.01);
(Continued)

(58) Field of Classification Search
CPC ... H04L 1/0004; H04L 1/0025; H04L 1/0031; H04L 1/1812; H04L 1/18; H04L 5/0053;
(Continued)

(56) References Cited

U.S. PATENT DOCUMENTS

2007/0081475 A1* 4/2007 Telado ................ H04L 1/0057
370/255
2010/0309861 A1* 12/2010 Gorokhov ............ H04B 1/7103
370/329
(Continued)

FOREIGN PATENT DOCUMENTS

EP 3131225 A1 2/2017
WO WO-2017157247 A1 9/2017

OTHER PUBLICATIONS

International Search Report and Written Opinionz—PCT/US2018/031195—ISA/EPO—Sep. 25, 2018.
(Continued)

*Primary Examiner* — Habte Mered
(74) *Attorney, Agent, or Firm* — Patterson and Sheridan, L.L.P

(57) ABSTRACT

Aspects of the present disclosure generally relate to wireless communication. For example, aspects of the present disclosure provide techniques for determining one or more modulation orders to be used for the communication of control channels and/or data channels. An exemplary method, performed by a UE, may include receiving downlink control information (DCI) that allocates resources for a communication, the DCI may include a first field that indicates a transport block size (TBS) of the communication and a second field, different from the first field, that indicates a modulation order of the communication, wherein the communication includes a transmission or a reception, and processing the communication according to the indicated modulation order. Numerous other aspects are provided.

21 Claims, 13 Drawing Sheets

(51) Int. Cl.
*H04L 5/00* (2006.01)
*H04B 7/06* (2006.01)
*H04L 27/34* (2006.01)
*H04L 1/18* (2006.01)

(52) U.S. Cl.
CPC ......... *H04L 5/0053* (2013.01); *H04W 72/042* (2013.01); *H04B 7/0632* (2013.01); *H04L 1/18* (2013.01); *H04L 1/1812* (2013.01); *H04L 5/0048* (2013.01); *H04L 27/34* (2013.01)

(58) Field of Classification Search
CPC ... H04L 5/0048; H04W 72/042; H04B 7/0632
See application file for complete search history.

(56) References Cited

U.S. PATENT DOCUMENTS

| | | | | |
|---|---|---|---|---|
| 2012/0320852 A1* | 12/2012 | Seo | ............... | H03M 13/6527 370/329 |
| 2015/0085767 A1* | 3/2015 | Einhaus | ............ | H04L 1/0016 370/329 |
| 2015/0304065 A1* | 10/2015 | Werner | ............... | H04B 10/27 398/58 |
| 2017/0013599 A1 | 1/2017 | Sun et al. | | |
| 2017/0163396 A1 | 6/2017 | Blankenship | | |
| 2017/0171014 A1 | 6/2017 | Chen et al. | | |
| 2019/0044646 A1* | 2/2019 | Xu | ............... | H04W 72/042 |
| 2019/0132089 A1* | 5/2019 | Hwang | ............... | H04L 1/0007 |
| 2019/0173726 A1* | 6/2019 | Wong | ............... | H04W 76/27 |

OTHER PUBLICATIONS

Qualcomm Incorporated: "Discussion on Modulation Scheme Selection for 256QAM", 3GPP Draft; R1-1708751 Discussion on Modulation Scheme Selection for 256QAM, 3rd Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 6, 2017, XP051262628, Retrieved from the Internet: URL:http://www.3gpp.org/ftp/tsg_ran/WG1_RL1/TSGR1_89/Docs/ [retrieved on May 6, 2017].

* cited by examiner

700

|  702 | 704 | 706 | 708 |
|---|---|---|---|
| CQI index | modulation | code rate x 1024 | efficiency |
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

710 → (row 11)
712 → (row 12)

*FIG. 7*

| RE/RB | CRS | DMRS | CSIRS | data tones | all data RE | MCS | I_TBS | TBS | TBS+CRC | SE | Cbits | code rate |
|---|---|---|---|---|---|---|---|---|---|---|---|---|
| 132 | 12 | 12 | 32 | 76 | 7600 | 0 | 0 | 2792 | 2816 | 0.370526 | 15200 | 0.185263 |
| 132 | 12 | 12 | 32 | 76 | 7600 | 1 | 1 | 3624 | 3648 | 0.48 | 15200 | 0.24 |
| 132 | 12 | 12 | 32 | 76 | 7600 | 2 | 2 | 4584 | 4608 | 0.606316 | 15200 | 0.303158 |
| 132 | 12 | 12 | 32 | 76 | 7600 | 3 | 3 | 5736 | 5760 | 0.757895 | 15200 | 0.378947 |
| 132 | 12 | 12 | 32 | 76 | 7600 | 4 | 4 | 7224 | 7296 | 0.96 | 15200 | 0.48 |
| 132 | 12 | 12 | 32 | 76 | 7600 | 5 | 5 | 8760 | 8832 | 1.162105 | 15200 | 0.581053 |
| 132 | 12 | 12 | 32 | 76 | 7600 | 6 | 6 | 10296 | 10368 | 1.364211 | 15200 | 0.682105 |
| 132 | 12 | 12 | 32 | 76 | 7600 | 7 | 7 | 12216 | 12288 | 1.616842 | 15200 | 0.808421 |
| 132 | 12 | 12 | 32 | 76 | 7600 | 8 | 8 | 14112 | 14208 | 1.869474 | 15200 | 0.934737 |
| 132 | 12 | 12 | 32 | 76 | 7600 | 9 | 9 | 15840 | 15936 | 2.096842 | 15200 | 1.048421 |
| 132 | 12 | 12 | 32 | 76 | 7600 | 10 | 9 | 15840 | 15936 | 2.096842 | 30400 | 0.524211 |
| 132 | 12 | 12 | 32 | 76 | 7600 | 11 | 10 | 17568 | 17664 | 2.324211 | 30400 | 0.581053 |
| 132 | 12 | 12 | 32 | 76 | 7600 | 12 | 11 | 19848 | 19968 | 2.627368 | 30400 | 0.656842 |
| 132 | 12 | 12 | 32 | 76 | 7600 | 13 | 12 | 22920 | 23040 | 3.031579 | 30400 | 0.757895 |
| 132 | 12 | 12 | 32 | 76 | 7600 | 14 | 13 | 25456 | 25600 | 3.368421 | 30400 | 0.842105 |
| 132 | 12 | 12 | 32 | 76 | 7600 | 15 | 14 | 28336 | 28480 | 3.747368 | 30400 | 0.936842 |
| 132 | 12 | 12 | 32 | 76 | 7600 | 16 | 15 | 30576 | 30720 | 4.042105 | 30400 | 1.010526 |
| 132 | 12 | 12 | 32 | 76 | 7600 | 17 | 15 | 30576 | 30720 | 4.042105 | 45600 | 0.673684 |
| 132 | 12 | 12 | 32 | 76 | 7600 | 18 | 16 | 32856 | 33024 | 4.345263 | 45600 | 0.724211 |
| 132 | 12 | 12 | 32 | 76 | 7600 | 19 | 17 | 36696 | 36864 | 4.850526 | 45600 | 0.808421 |
| 132 | 12 | 12 | 32 | 76 | 7600 | 20 | 18 | 39232 | 39424 | 5.187368 | 45600 | 0.864561 |
| 132 | 12 | 12 | 32 | 76 | 7600 | 21 | 19 | 43816 | 44032 | 5.793684 | 45600 | 0.965614 |
| 132 | 12 | 12 | 32 | 76 | 7600 | 22 | 20 | 46888 | 47104 | 6.197895 | 45600 | 1.032982 |
| 132 | 12 | 12 | 32 | 76 | 7600 | 23 | 21 | 51024 | 51264 | 6.745263 | 45600 | 1.124211 |
| 132 | 12 | 12 | 32 | 76 | 7600 | 24 | 22 | 55056 | 55296 | 7.275789 | 45600 | 1.212632 |
| 132 | 12 | 12 | 32 | 76 | 7600 | 25 | 23 | 57336 | 57600 | 7.578947 | 45600 | 1.263158 |
| 132 | 12 | 12 | 32 | 76 | 7600 | 26 | 24 | 61664 | 61952 | 8.151579 | 45600 | 1.358596 |
| 132 | 12 | 12 | 32 | 76 | 7600 | 27 | 25 | 63776 | 64064 | 8.394737 | 45600 | 1.404912 |
| 132 | 12 | 12 | 32 | 76 | 7600 | 28 | 26 | 75376 | 75712 | 9.962105 | 45600 | 1.660351 |

| MCS Index | Modulation Order | Modulation Order adjustment | TBS Index |
|---|---|---|---|
| 0 | 2 | Increase | 0 |
| 1 | 2 | Increase | 2 |
| 2 | 2 | Increase | 4 |
| 3 | 2 | Increase | 6 |
| 4 | 2 | Increase | 8 |
| 5 | 4 | Decrease | 10 |
| 6 | 4 | Decrease | 11 |
| 7 | 4 | Decrease | 12 |
| 8 | 4 | Increase | 13 |
| 9 | 4 | Increase | 14 |
| 10 | 4 | Increase | 15 |
| 11 | 6 | Decrease | 16 |
| 12 | 6 | Decrease | 17 |
| 13 | 6 | Decrease | 18 |
| 14 | 6 | Decrease | 19 |
| 15 | 6 | Increase | 20 |
| 16 | 6 | Increase | 21 |
| 17 | 6 | Increase | 22 |
| 18 | 6 | Increase | 23 |
| 19 | 6 | Increase | 24 |
| 20 | 8 | Decrease | 25 |
| 21 | 8 | Decrease | 27 |
| 22 | 8 | Decrease | 28 |
| 23 | 8 | Decrease | 29 |
| 24 | 8 | Decrease | 30 |
| 25 | 8 | Decrease | 31 |
| 26 | 8 | Decrease | 32 |
| 27 | 8 | Decrease | 33/33A |
| 28 | 2 | N/A | reserved |
| 29 | 4 | N/A | |
| 30 | 6 | N/A | |
| 31 | 8 | N/A | |

1110 → (row indicator)

*FIG. 11*

ENHANCEMENTS TO MODULATION ORDER DETERMINATION

CROSS-REFERENCE TO RELATED APPLICATIONS

The present application for patent claims priority to U.S. Provisional Application No. 62/502,570, filed May 5, 2017, which is assigned to the assignee hereof and hereby expressly incorporated by reference herein in its entirety.

BACKGROUND

Field of the Invention

Certain aspects of the present disclosure generally relate to wireless communications and, more particularly, to techniques for determining one or more modulation orders to be used for the communication of control channels and/or data channels.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, gaming devices, navigation devices, virtual reality devices, wearable devices (e.g., smart glasses/goggles/heads-up displays, smart watch, smart wristband), etc. Some UEs may be considered machine-type communication (MTC) UEs, which may include remote devices, such as sensors, meters, monitors, location tags, drones, trackers, robots, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To improve performance of wireless communications improved techniques for determining one or more modulation orders to be used for the communication of control channels and/or data channels are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving downlink control information (DCI) that allocates resources for a communication, the DCI includes a first field that indicates a transport block size (TBS) of the communication and a second field, different from the first field, that indicates a modulation order of the communication, wherein the communication includes a transmission or a reception and processing the communication according to the indicated modulation order.

Certain aspects of the present disclosure provide a method for wireless communications by a base station (BS). The method generally includes transmitting downlink control information (DCI), that allocates resources for a communication, the DCI includes a first field that indicates a transport block size (TBS) of the communication and a second field, different from the first field, that indicates a modulation order of the communication, wherein the communication includes a transmission or a reception and processing the communication according to the indicated modulation order.

Certain aspects of the present disclosure provide a method for wireless communications by a user equipment (UE). The method generally includes receiving downlink control information (DCI) that includes a resource allocation for a communication, the DCI includes a field that indicates a transport block size (TBS) of the communication, wherein the communication includes a transmission or a reception, determining a number of resource elements (REs) for the communication based at least on the resource allocation, determining a modulation order for the communication based on the number of REs and the TBS, and processing the communication according to the determined modulation order.

Certain aspects of the present disclosure provide a method for wireless communications by a base station (BS). The method generally includes transmitting downlink control information (DCI) that includes a resource allocation for a communication, the DCI includes a field that indicates a transport block size (TBS) of the communication, wherein the communication includes a transmission or a reception, determining a number of resource elements (REs) for the communication based at least on the resource allocation, determining a modulation order for the communication based on the number of REs and the TBS, and processing the communication according to the determined modulation order.

Certain aspects of the present disclosure provide an apparatus for wireless communications. The apparatus generally includes a processor configured to cause the apparatus to receive downlink control information (DCI) that allocates resources for a communication, the DCI includes a first field that indicates a transport block size (TBS) of the communication and a second field, different from the first field, that indicates a modulation order of the communication, wherein the communication includes a transmission or a reception and to process the communication according to the indicated modulation order, and a memory coupled with the processor.

Certain aspects of the present disclosure provide an apparatus for wireless communications. The apparatus generally includes a processor configured to cause the apparatus to transmit downlink control information (DCI), that allocates resources for a communication, the DCI includes a first field that indicates a transport block size (TBS) of the communication and a second field, different from the first field, that indicates a modulation order of the communication, wherein the communication includes a transmission or a reception and to process the communication according to the indicated modulation order, and a memory coupled with the processor.

Certain aspects of the present disclosure provide an apparatus for wireless communications. The apparatus generally includes a processor configured to cause the apparatus to receive downlink control information (DCI) that includes a resource allocation for a communication, the DCI includes a field that indicates a transport block size (TBS) of the communication, wherein the communication includes a transmission or a reception, determining a number of resource elements (REs) for the communication based at least on the resource allocation, to determine a modulation order for the communication based on the number of REs and the TBS, and to process the communication according to the determined modulation order, and a memory coupled with the processor.

Certain aspects of the present disclosure provide an apparatus for wireless communications. The apparatus generally includes a processor configured to cause the apparatus to transmit downlink control information (DCI) that includes a resource allocation for a communication, the DCI includes a field that indicates a transport block size (TBS) of the communication, wherein the communication includes a transmission or a reception, to determine a number of resource elements (REs) for the communication based at least on the resource allocation, to determine a modulation order for the communication based on the number of REs and the TBS, and to process the communication according to the determined modulation order, and a memory coupled with the processor.

Certain aspects of the present disclosure provide an apparatus for wireless communications. The apparatus generally includes means for receiving downlink control information (DCI) that allocates resources for a communication, the DCI includes a first field that indicates a transport block size (TBS) of the communication and a second field, different from the first field, that indicates a modulation order of the communication, wherein the communication includes a transmission or a reception and means for processing the communication according to the indicated modulation order.

Certain aspects of the present disclosure provide an apparatus for wireless communications. The apparatus generally includes means for transmitting downlink control information (DCI), that allocates resources for a communication, the DCI includes a first field that indicates a transport block size (TBS) of the communication and a second field, different from the first field, that indicates a modulation order of the communication, wherein the communication includes a transmission or a reception and means for processing the communication according to the indicated modulation order.

Certain aspects of the present disclosure provide an apparatus for wireless communications. The apparatus generally includes means for receiving downlink control information (DCI) that includes a resource allocation for a communication, the DCI includes a field that indicates a transport block size (TBS) of the communication, wherein the communication includes a transmission or a reception, means for determining a number of resource elements (REs) for the communication based at least on the resource allocation, means for determining a modulation order for the communication based on the number of REs and the TBS, and means for processing the communication according to the determined modulation order.

Certain aspects of the present disclosure provide an apparatus for wireless communications. The apparatus generally includes means for transmitting downlink control information (DCI) that includes a resource allocation for a communication, the DCI includes a field that indicates a transport block size (TBS) of the communication, wherein the communication includes a transmission or a reception, means for determining a number of resource elements (REs) for the communication based at least on the resource allocation, means for determining a modulation order for the communication based on the number of REs and the TBS, and means for processing the communication according to the determined modulation order.

Certain aspects of the present disclosure provide a computer-readable medium for wireless communications. The computer-readable medium includes instructions that, when executed by a processing system, cause the processing system to perform operations generally including receiving downlink control information (DCI) that allocates resources for a communication, the DCI includes a first field that indicates a transport block size (TBS) of the communication and a second field, different from the first field, that indicates a modulation order of the communication, wherein the communication includes a transmission or a reception and processing the communication according to the indicated modulation order.

Certain aspects of the present disclosure provide a computer-readable medium for wireless communications. The computer-readable medium includes instructions that, when executed by a processing system, cause the processing system to perform operations generally including transmitting downlink control information (DCI), that allocates resources for a communication, the DCI includes a first field that indicates a transport block size (TBS) of the communication and a second field, different from the first field, that indicates a modulation order of the communication, wherein the communication includes a transmission or a reception and processing the communication according to the indicated modulation order.

Certain aspects of the present disclosure provide a computer-readable medium for wireless communications. The computer-readable medium includes instructions that, when executed by a processing system, cause the processing system to perform operations generally including receiving downlink control information (DCI) that includes a resource allocation for a communication, the DCI includes a field that indicates a transport block size (TBS) of the communication, wherein the communication includes a transmission or a reception, determining a number of resource elements (REs)

for the communication based at least on the resource allocation, determining a modulation order for the communication based on the number of REs and the TBS, and processing the communication according to the determined modulation order.

Certain aspects of the present disclosure provide a computer-readable medium for wireless communications. The computer-readable medium includes instructions that, when executed by a processing system, cause the processing system to perform operations generally including transmitting downlink control information (DCI) that includes a resource allocation for a communication, the DCI includes a field that indicates a transport block size (TBS) of the communication, wherein the communication includes a transmission or a reception, determining a number of resource elements (REs) for the communication based at least on the resource allocation, determining a modulation order for the communication based on the number of REs and the TBS, and processing the communication according to the determined modulation order.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an exemplary table of communication parameters.

FIG. 8 illustrates an exemplary table of communication parameters.

FIG. 11 illustrates an exemplary table of MCS indices, modulation orders, modulation order adjustments, and TBS indices, in accordance with certain aspects of the present disclosure.

DETAILED DESCRIPTION

Figure 1:
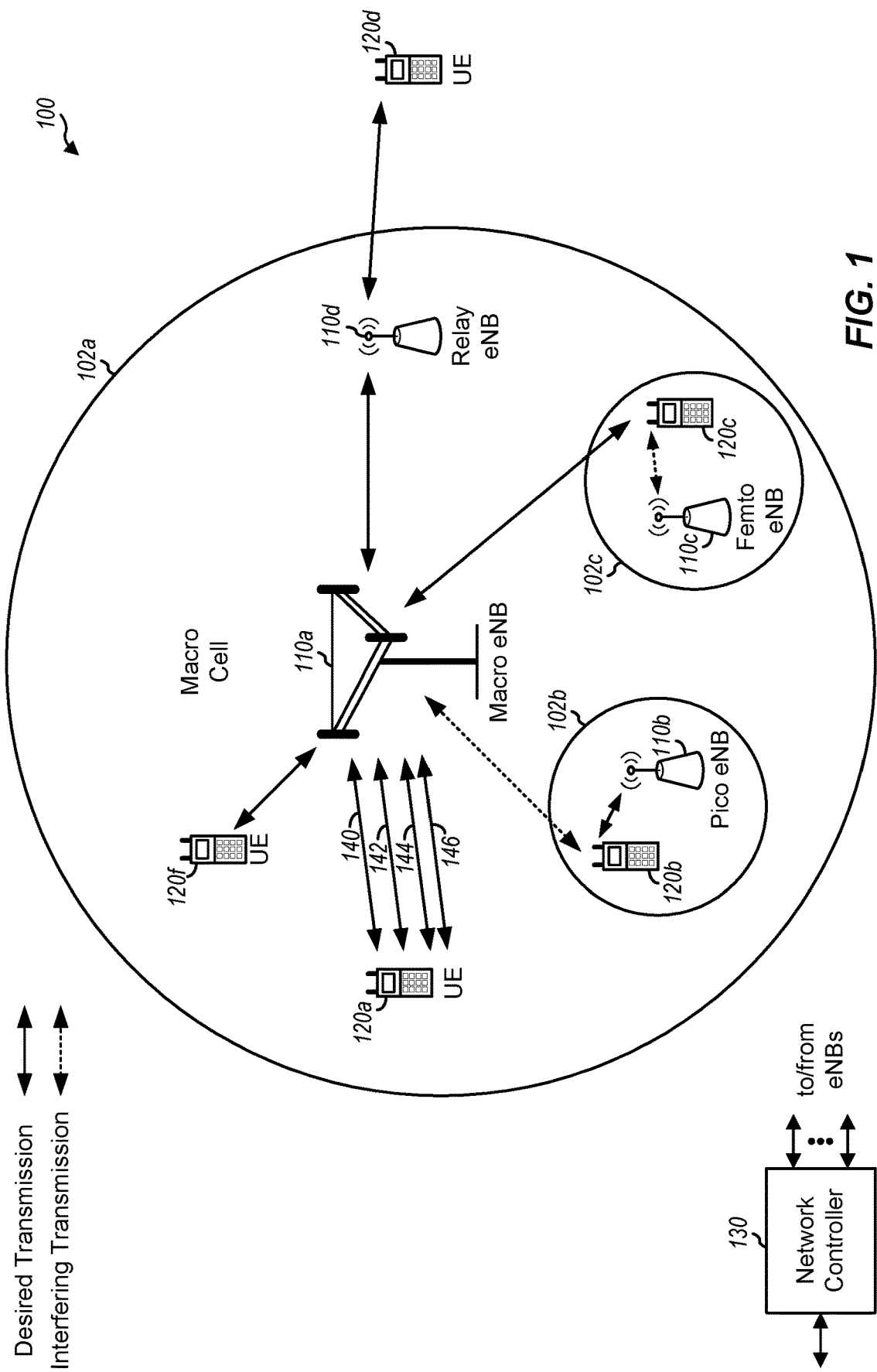
FIG. 1 is a block diagram conceptually illustrating an example of a wireless communication network, in accordance with certain aspects of the present disclosure.

Aspects of the present disclosure provide various techniques for determining one or more modulation orders to be used for the communication of control channels and/or data channels. When data is transmitted in a digital wireless network, the data is coded and modulated (e.g., by the transmitter) to generate symbols that are transmitted. The received symbols are demodulated and decoded (e.g., by the receiver) to recover the data. For example, modulation may be performed using quadrature phase shift keying (QPSK), 16 quadrature amplitude modulation (16QAM), 64 quadrature amplitude modulation (64QAM), 256 quadrature amplitude modulation (256QAM), 1024 quadrature amplitude modulation (1024QAM) and other techniques. A preferred modulation technique for a transmission may be selected based on channel conditions (e.g., signal-to-interference-and-noise ratio (SINR) or channel state information (CSI)) between the transmitter and the receiver. Using a modulation technique lower than the preferred modulation technique may result in sending less data than the channel can support, lowering data throughput and possibly wasting transmission (e.g., time and frequency) resources. Using a modulation technique higher than the preferred modulation technique may result in signals not being successfully received, possibly necessitating data retransmissions that may also lower data throughput and possibly waste transmission resources.

According to previously known techniques (e.g., LTE) a modulation order for a communication (e.g., a transmission or reception) is selected from a table of transport block sizes (TBS) and corresponding modulation orders. The TBS and corresponding modulation order for the communication may be signaled in downlink control information (DCI) allocating transmission resources for the communication.

According to aspects of the present disclosure, improved techniques are provided for indicating a modulation order for a communication (e.g., based on information other than the TBS indicated in DCI).

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

FIG. 1 illustrates an example wireless communication network 100, in which aspects of the present disclosure may be practiced. For example, one or more signals used for searching for a cell and acquiring a cell may be transmitted by one or more BSs in the wireless communication network 100 to one or more UEs in the wireless communication network 100. As will be described in more detail below, the techniques presented herein may be used by the BS(s) and/or UE(s) to reduce the amount of time associated with (UEs) performing cell acquisition based on the one or more signals. As used herein, the term "cell acquisition" may be used to refer to searching for a cell and/or acquiring the cell (e.g., synchronizing to the cell).

The wireless communication network 100 may be an LTE network or some other wireless network. Wireless communication network 100 may include a number of evolved NodeBs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a network interface to a backhaul. The eNBs may also communicate with one another, e.g., directly or indirectly via network interfaces to a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Examples of UEs may include a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, in LTE Rel-12, when compared to legacy and/or advanced UEs in the LTE network, the LC UEs may operate with one or more of the following: a reduction in maximum bandwidth (relative to legacy UEs), a single receive radio frequency (RF) chain, reduction of peak rate (e.g., a maximum of 1000 bits for a transport block size (TBS) may be supported), reduction of transmit power, rank 1 transmission, half duplex operation, etc. In some cases, if half duplex operation is supported, the LC UEs may have a relaxed switching timing from transmit to receive (or from receive to transmit) operations. For example, in one case, compared to a switching timing of 20 microseconds (us) for legacy and/or advanced UEs, the LC UEs may have a relaxed switching timing of 1 millisecond (ms).

In some cases, the LC UEs (e.g., in LTE Rel-12) may also be able to monitor downlink (DL) control channels in the same way as legacy and/or advanced UEs in the LTE network monitor DL control channels. Release 12 MTC UEs may still monitor downlink (DL) control channels in the same way as regular UEs, for example, monitoring for wideband control channels in the first few symbols (e.g., physical downlink control channel (PDCCH)) as well as narrowband control channels occupying a relatively narrowband, but spanning a length of a subframe (e.g., enhanced PDCCH (ePDCCH)).

The wireless communication network 100, as an alternative or in addition to supporting MTC operation, may support additional MTC enhancements (e.g., eMTC operations). For example, LC eMTC UEs (e.g., in LTE Rel-13)

may be able to support narrowband operation (e.g., limited to a particular narrowband assignment of 1.4 MHz or six resource blocks (RBs) partitioned out of the available system bandwidth) while co-existing within a wider system bandwidth (e.g., at 1.4/3/5/10/15/20 MHz). The LC eMTC UE may also be able to support one or more coverage modes of operation. For example, the LC eMTC UE may be able to support coverage enhancements up to 15 dB.

As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

In some cases, a UE (e.g., LC UE or non-LC UE) may perform a cell search and acquisition procedure before communicating in the network. In one case, with reference to the LTE network illustrated in FIG. 1 as an example, the cell search and acquisition procedure may be performed when the UE is not connected to a LTE cell and wants to access the LTE network. In these cases, the UE may have just powered on, restored a connection after temporarily losing connection to the LTE cell, etc.

In other cases, the cell search and acquisition procedure may be performed when the UE is already connected to a LTE cell. For example, the UE may have detected a new LTE cell and may prepare a handover to the new cell. As another example, the UE may be operating in one or more low power states (e.g., may support discontinuous reception (DRX)) and, upon exiting the one or more low power states, may have to perform the cell search and acquisition procedure (even though the UE is still in connected mode).

Figure 2:
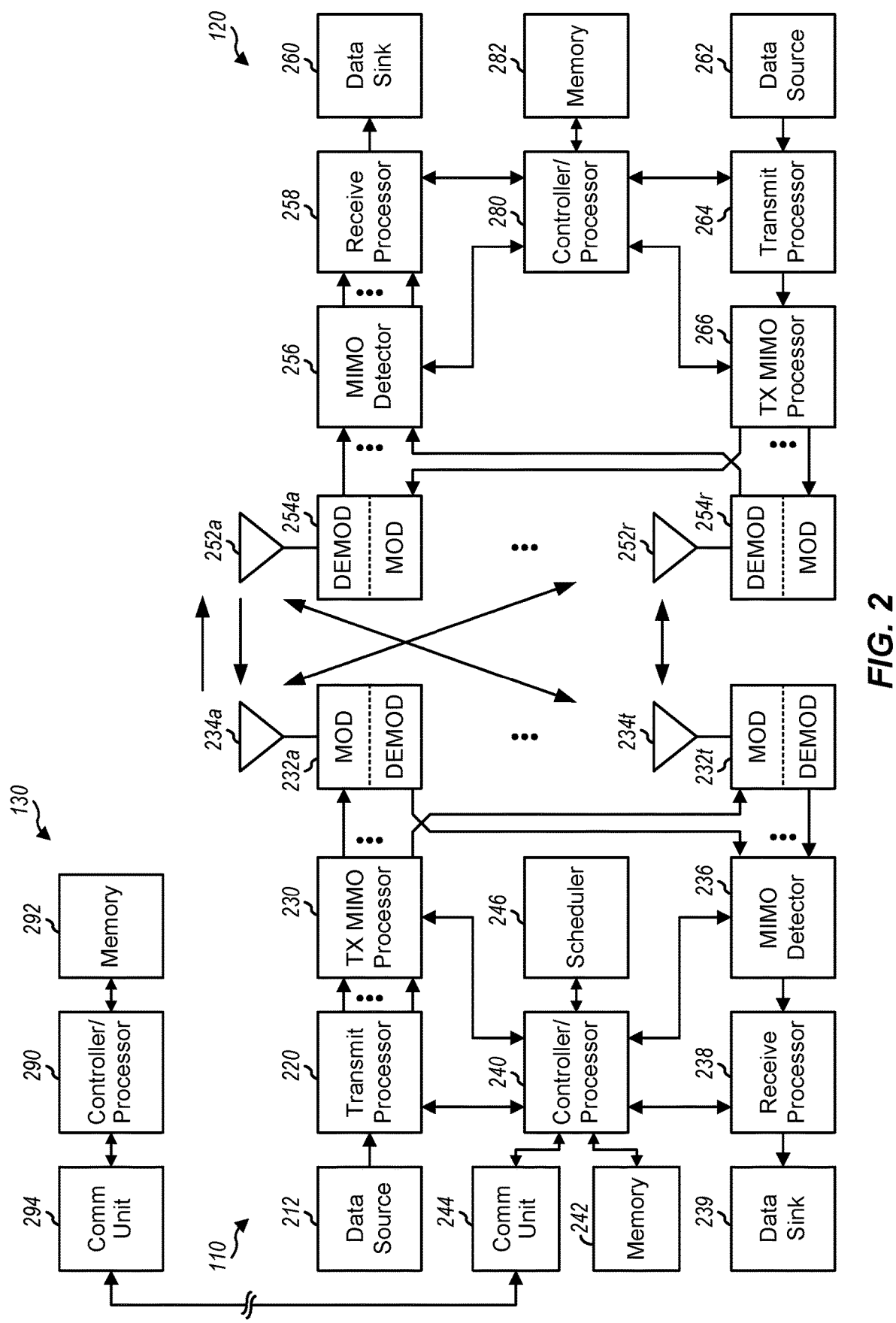
FIG. 2 shows a block diagram conceptually illustrating an example of a base station in communication with a user equipment (UE) in a wireless communications network, in accordance with certain aspects of the present disclosure.

FIG. 2 is a block diagram of a design of BS/eNB 110 and UE 120, which may be one of the BSs/eNBs 110 and one of the UEs 120, respectively, in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports including RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to BS 110. At BS 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively. For example, controller/processor 240 and/or other processors and modules at BS 110 may perform or direct operations 1000 and 1300 illustrated in FIGS. 10 and 13 and/or other processes for the techniques described herein. Similarly, controller/processor 280 and/or other processors and modules at UE 120 may perform or direct operations 900 and 1200 illustrated in FIGS. 9 and 12 and/or processes for the techniques described herein. Memories 242 and 282 may store data and program codes for BS 110 and UE 120, respectively. A scheduler 246 may schedule UEs for data transmission on the downlink and/or uplink.

Figure 3:
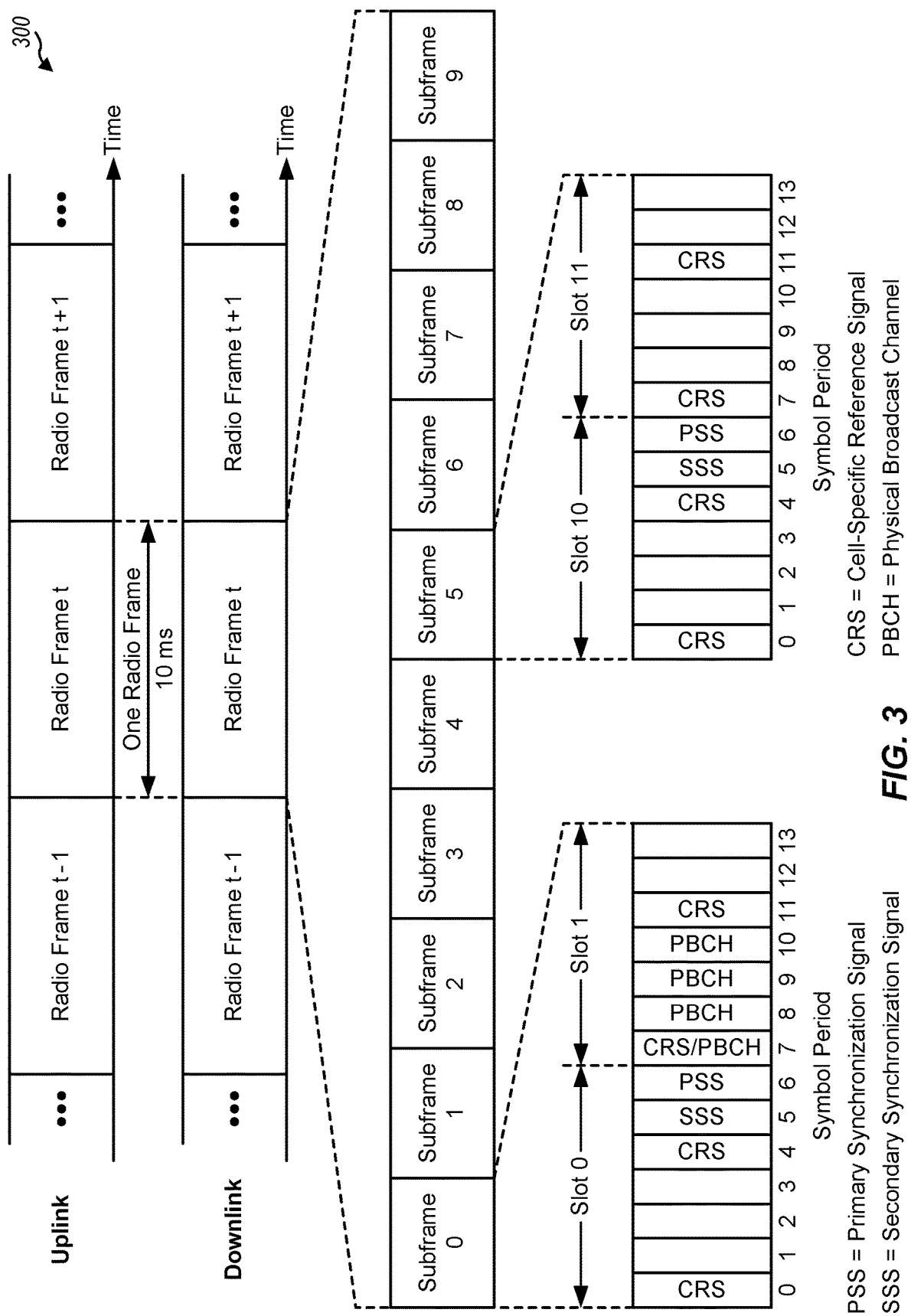
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. For example, the PSS may provide the UE with information regarding the physical layer identity (e.g., 0 to 2), which may identify which of three groups of physical layer cell identifies a LTE cell may belong. The PSS may also be used by the UE in symbol timing detection, frequency offset detection, etc. The SSS may provide the UE with information regarding the physical layer cell identity group number (e.g., 0 to 167) and may be used by the UE for radio frame timing detection, cyclic prefix length detection, time division duplexing (TDD)/frequency division duplexing (FDD) detection, etc.

With the physical layer identity (e.g., from PSS) and the physical layer cell identity group number (e.g., from SSS), the UE may determine the physical layer cell identify (PCI) for a given cell. Once the UE knows the PCI for a given cell, as described below, the UE may know the location of reference signals transmitted from the cell and may be able to receive and decode system information (e.g., used for acquiring the cell) transmitted from the cell.

The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames.

The PBCH may carry some system information (e.g., the master information block (MIB)) that, in general, may be used by UEs for initial access to the cell, and the like. For example, the PBCH may carry information regarding system bandwidth, number of transmit antennas, system frame number, etc. The eNB may also transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
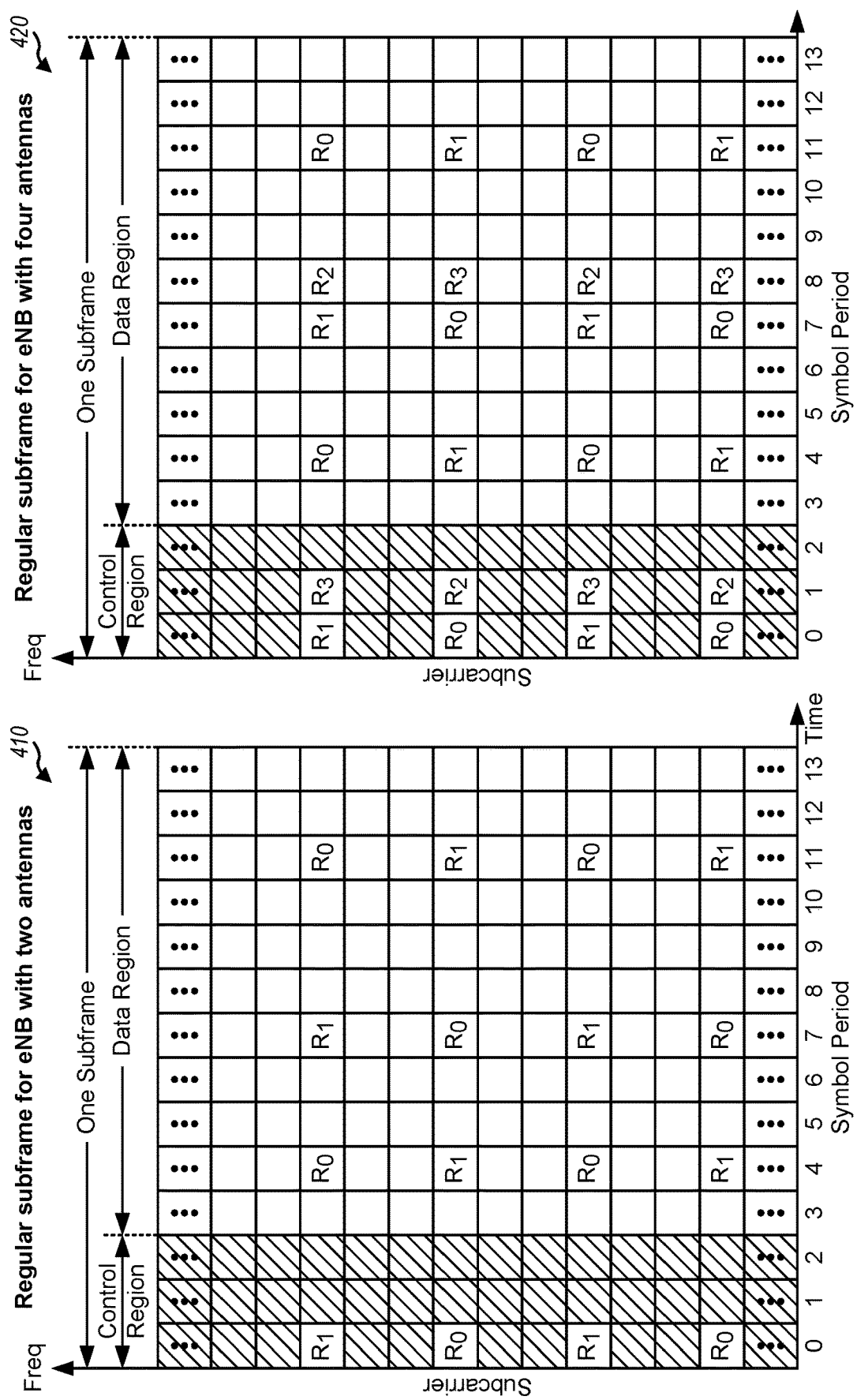
FIG. 4 is a block diagram conceptually illustrating two exemplary subframe formats with the normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network. For example, as noted above, The LC UE may be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. Further, in some cases, non-LC UEs may also be able to support the CE mode.

Example Enhancements to Modulation Order Determination

As mentioned above, one or more techniques presented herein may be used by one or more BSs, network devices, and/or UEs to indicate a modulation order for a communication (e.g., based on information other than the TBS indicated in DCI scheduling the communication). Similarly, disclosed techniques may be used by one or more BSs, network devices, and/or UEs to determine a modulation order for a communication (e.g., based on information other than the TBS indicated in DCI scheduling the communication). The one or more techniques presented herein may improve utilization of transmission resources in a wireless communication network, for example, by improving data throughput between a BS and a UE.

Figure 5B:
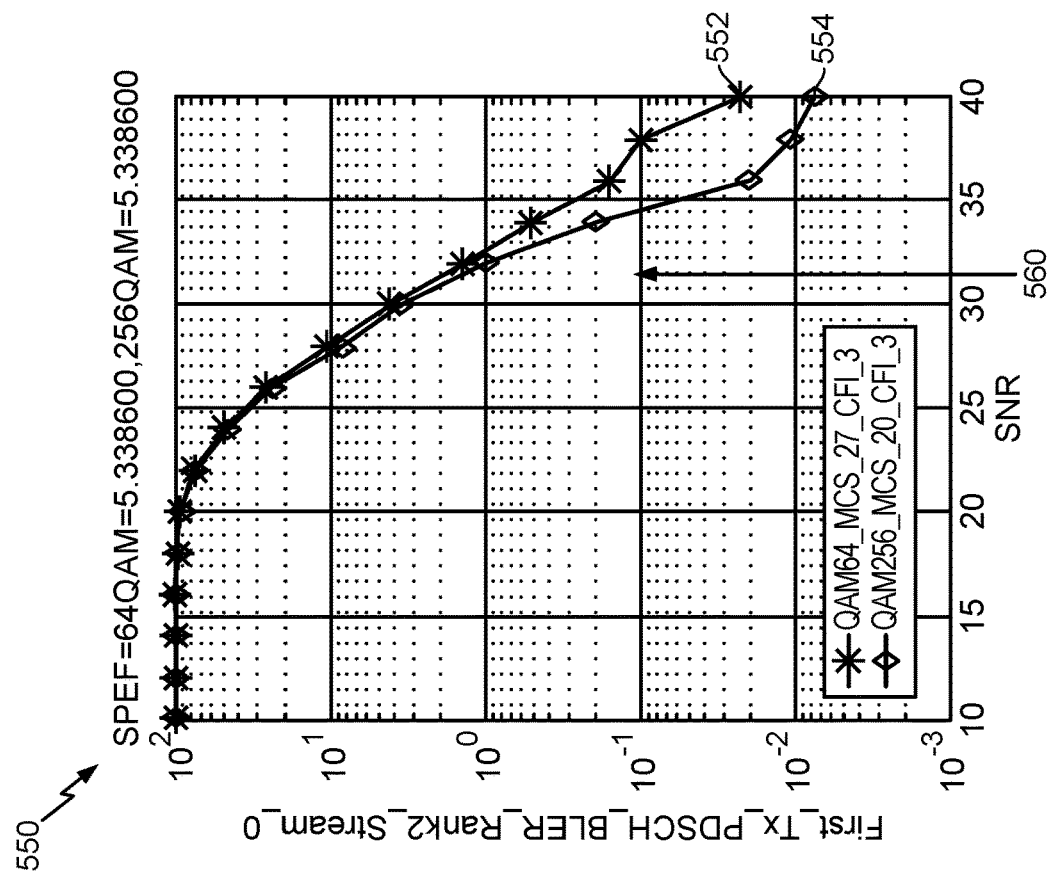
FIGS. 5A and 5B illustrate exemplary graphs of performance of a communications link.
Figure 5A:
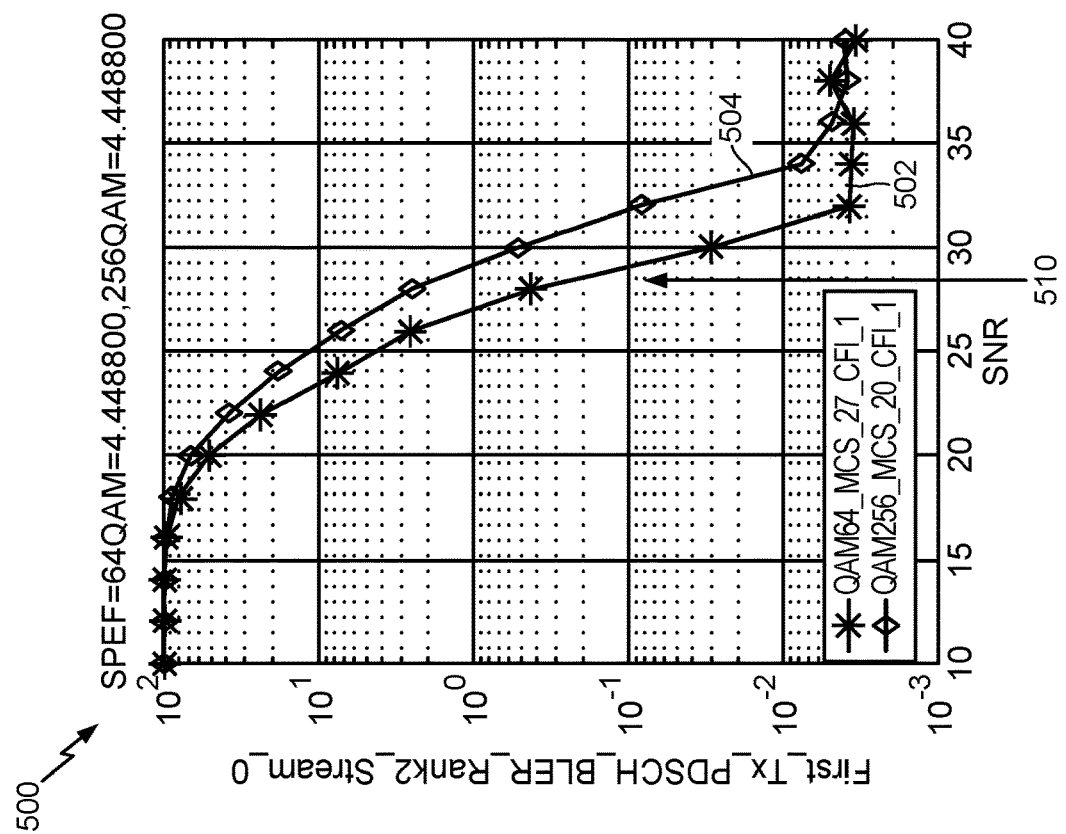
Figure 6:
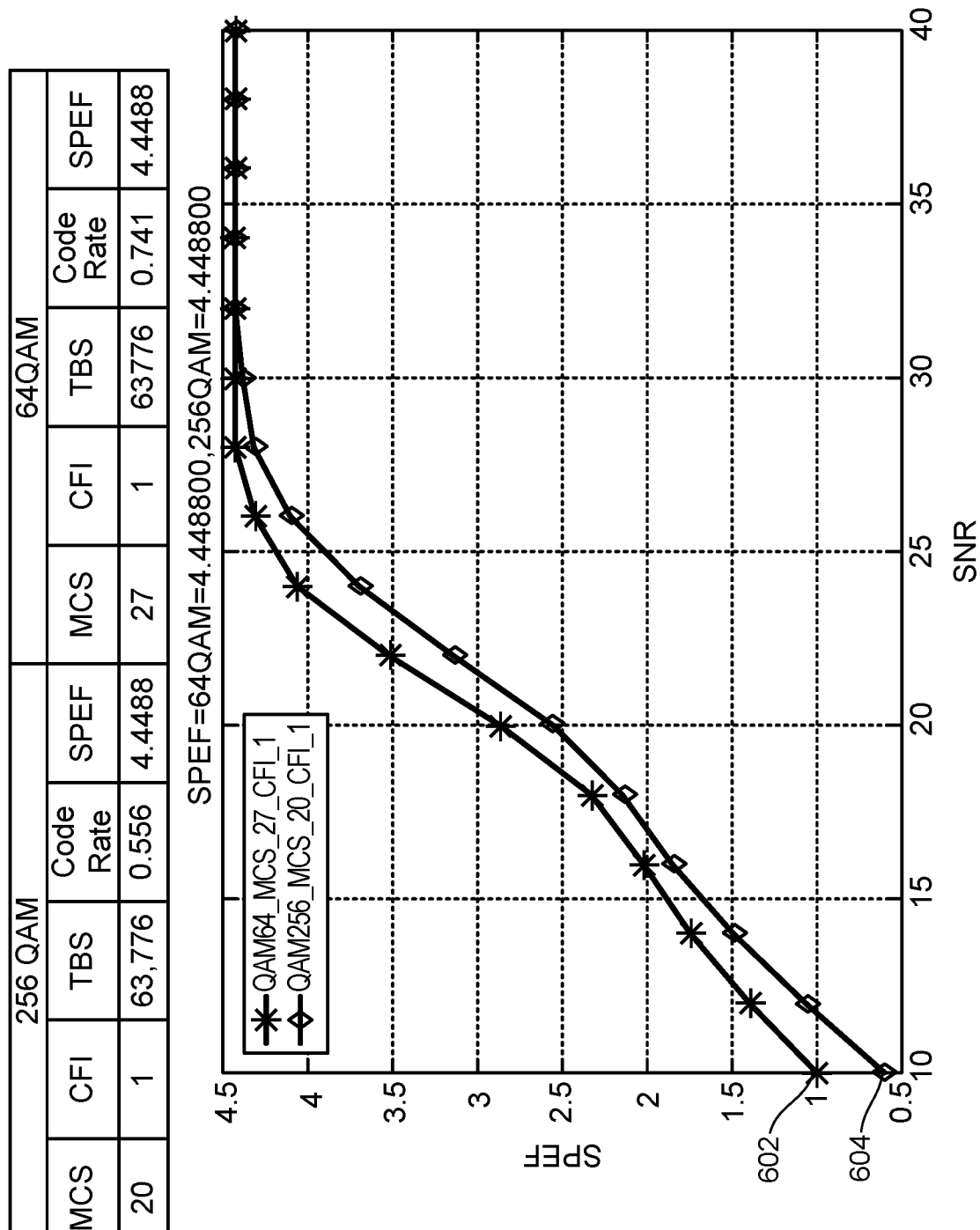
FIG. 6 illustrates an exemplary graph of performance of a communications link.

For example, MCS tables (e.g., in LTE standards) for 256QAM or other modulation schemes may be suboptimal for transmissions using one symbol for control channels (e.g., CFI=1), as illustrated by FIGS. 5A, 5B, and 6, below.

FIGS. 5A and 5B illustrates exemplary graphs 500 and 550 of performances of communications links, such as the links 140, 142, 144, and 146 between BS 110a and UE 120a in communications system 100, shown in FIG. 1. In the exemplary graph 500 shown in FIG. 5A, a first curve 502 and a second curve 504 that relate block error rate (BLER) to signal-to-noise ratios (SNR) in the 3GPP extended pedestrian A model 5 (EPA5) test scenario are shown. The first curve 502 is for transmissions using transmission mode 4 (TM4) with one symbol used for control signaling (e.g., CFI=1) and using 64QAM modulation, represented as link 140. The second curve 504 relates BLER to SNR (also using the EPA5 test scenario) for transmissions using transmission mode 4 (TM4) with one symbol used for control signaling (e.g., CFI=1) and using 256QAM modulation, represented as link 142. In both cases, the transport block size is the same (63,776 bits). As illustrated at 510, transmissions using 64QAM modulation consistently have a lower BLER for the same SNR, indicating that 64QAM modulation outperforms 256QAM modulation in those conditions. In the exemplary graph 550 shown in FIG. 5B, a third curve 552 and a fourth curve 554 that also relate block error rate (BLER) to signal-to-noise ratios (SNR) in the 3GPP extended pedestrian A model 5 (EPA5) test scenario are shown. The third curve 552 is for transmissions using transmission mode 4 (TM4) with three symbols used for control signaling (e.g., CFI=3) and using 64QAM modulation, represented as link 144. The fourth curve 554 relates BLER to SNR (also using the EPA5 test scenario) for transmissions using transmission mode 4 (TM4) with three symbols used for control signaling (e.g., CFI=3) and using 256QAM modulation, represented as link 146. In both cases, the transport block size is the same (63,776 bits). As illustrated at 560, transmissions using 256QAM modulation consistently have a lower BLER for the same SNR, indicating that 256QAM modulation outperforms 64QAM modulation in those conditions. Thus, the optimal modulation technique for transmissions between any two devices (e.g., BS 110a and UE 120a) may depend on how many symbols (e.g., 1 or 3) are being used for transmission of control channels.

FIG. 6 illustrates an exemplary graph 600 of performance of a communications link, such as the links 140 and 142 between BS 110a and UE 120a in communications system 100, shown in FIG. 1. In the exemplary graph, a first curve 602 relating spectral efficiency (SPEF) to signal-to-noise ratios (SNR) for transmissions using a transport block size (TBS) of 63,776 bits is shown. The first curve 602 is for transmissions with one symbol used for control signaling (e.g., CFI=1) and using 64QAM modulation, represented as link 140. A second curve 604 relating SPEF to SNR for transmissions using a TBS of 63,776 bits for transmissions with one symbol used for control signaling (e.g., CFI=1) and using 256QAM modulation is also shown, represented as link 142. As illustrated, using 64QAM modulation results in a spectral efficiency that is greater than or equal to the spectral efficiency for transmissions using 256QAM modulation, regardless of the SNR.

In previously known techniques, a UE may transmit a channel quality indicator (CQI) index to a BS. The BS may refer to a table of CQI indices, modulation order, and code rates to determine a modulation technique and code rate to use in transmitting to the UE. FIG. 7 illustrates an exemplary table 700 of CQI indices 702, modulation orders 704, code rates 706, and spectral efficiencies 708. A BS receiving a CQI index (e.g., in a PUCCH) of eleven from a UE may determine to schedule a transmission to the UE using 64QAM modulation and a code rate of 873/1024=0.8525, as illustrated in the row 710. Similarly, a BS receiving a CQI index (e.g., in a PUCCH) of twelve from a UE may determine to schedule a transmission to the UE using 256QAM modulation and a code rate of 711/1024=0.6943, as illustrated in the row 712. However, it should be noted that the exemplary table 700 is designed to achieve optimal spectral efficiencies for transmissions using three symbols for control channels (e.g., CFI=3) and using two cell-specific resource signal (CRS) ports. In many situations, a BS may use a different number (e.g., one or two) of symbols for control channels and/or use a different number (e.g. four) of CRS ports.

FIG. 8 illustrates an exemplary table 800 relating a number of resource elements per resource block (RE/RB) 802; CRS REs per RB 804; DMRS REs per RB 806; channel state information reference signal (CSI-RS) REs per RB 808; remaining data REs per RB 810 after removing CRS, DMRS, and CSI-RS REs; number of data REs in a 100 RB bandwidth 812; modulation and coding scheme (MCS) index 814; TBS index 816; TBS in bits 818; TBS plus cyclic redundancy check (CRC) in bits 820; spectral efficiency (SE) 822; number of channel bits after rate matching (Chbits) 824; and corresponding code rate 826 for a transmission sent using the modulation scheme corresponding to the MCS index 814, transmission mode 9 (TM9), and 32 CSI-RS REs per resource block. Such a number of DMRS and CSI-RS REs might be used by a base station operating with full-dimension multiple input multiple output (FD-MIMO) techniques. As can be seen at 840, 842, and 844, some TBS are unusable in this setting, because there are insufficient Chbits available to encode the number of TBS and CRC bits for that MCS index, or because the rate may be above the required threshold for decodability (0.931).

As shown above with reference to FIG. 6, for transmissions using one symbol for control channels (CFI=1) and having a TBS of 63,776 bits, higher spectral efficiency can be achieved by using MCS 27 and 64QAM than by using 256QAM and MCS 20. However, using 64QAM and MCS 27 for all transmissions may cause selection of an inefficient and/or suboptimal modulation order for transmissions using three symbols for control channels (CFI=3).

Reproduced below is an exemplary table of MCS indices ($I_{MCS}$), modulation orders ($Q_m$ and $Q'_m$), and TBS indices ($I_{TBS}$), according to previously known techniques.

| Modulation and TBS index table for PDSCH | | | |
| --- | --- | --- | --- |
| MCS Index $I_{MCS}$ | Modulation Order $Q_m$ | Modulation Order $Q'_m$ | TBS Index $I_{TBS}$ |
| 0 | 2 | 2 | 0 |
| 1 | 2 | 2 | 1 |
| 2 | 2 | 2 | 2 |
| 3 | 2 | 2 | 3 |
| 4 | 2 | 2 | 4 |
| 5 | 2 | 4 | 5 |

-continued

Modulation and TBS index table for PDSCH

| MCS Index $I_{MCS}$ | Modulation Order $Q_m$ | Modulation Order $Q'_m$ | TBS Index $I_{TBS}$ |
|---|---|---|---|
| 6 | 2 | 4 | 6 |
| 7 | 2 | 4 | 7 |
| 8 | 2 | 4 | 8 |
| 9 | 2 | 4 | 9 |
| 10 | 4 | 6 | 9 |
| 11 | 4 | 6 | 10 |
| 12 | 4 | 6 | 11 |
| 13 | 4 | 6 | 12 |
| 14 | 4 | 6 | 13 |
| 15 | 4 | 6 | 14 |
| 16 | 4 | 6 | 15 |
| 17 | 6 | 6 | 15 |
| 18 | 6 | 6 | 16 |
| 19 | 6 | 6 | 17 |
| 20 | 6 | 6 | 18 |
| 21 | 6 | 6 | 19 |
| 22 | 6 | 6 | 20 |
| 23 | 6 | 6 | 21 |
| 24 | 6 | 6 | 22 |
| 25 | 6 | 6 | 23 |
| 26 | 6 | 6 | 24 |
| 27 | 6 | 6 | 25 |
| 28 | 6 | 6 | 26/26A |
| 29 | 2 | 2 | reserved |
| 30 | 4 | 4 | |
| 31 | 6 | 6 | |

In the table above, the third column ($Q'_m$) indicates the modulation order for a transmission that is transmitted only in the second slot of a subframe, while the second column ($Q_m$) indicates the modulation order for a transmission that is transmitted in the first and second slots of a subframe. A modulation order of 2 corresponds to the QPSK modulation technique, a modulation order of 4 corresponds to the 16QAM modulation technique, and a modulation order of 6 corresponds to the 64QAM technique. As seen in the table above, for MCS 8 and 9 transmissions that are in both slots of a subframe, the modulation order is 2, indicating that the MCS 8 and MCS 9 transmissions are modulated using the QPSK technique. Similarly, for MCS 15 and 16 transmissions that are in both slots of a subframe, the modulation order is 4, indicating that the MCS 15 and MCS 16 transmissions are modulated using the 16QAM technique.

As shown above with reference to FIG. 8, for base stations operating using FD-MIMO, the issue of unusable TBS can be avoided by using a 16QAM modulation technique for MCS 8 and 9 transmissions instead of the previously known QPSK modulation technique and a 64QAM modulation technique for MCS 15 and 16 transmissions instead of the previously known 16QAM technique. However, for subframes without CSI-RS REs, previously known modulation mappings (e.g., the mappings shown in the exemplary table above) would result in higher data throughputs and/or a lower BLER.

In accordance with aspects of the present disclosure, modulation order for a communication may be signaled (e.g., explicitly or implicitly).

According to aspects of the present disclosure, bits of downlink control information (DCI) allocating resources for a communication, separate from the field indicating the MCS index, may indicate a modulation order for the communication. The MCS index may indicate the TBS for the communication, but not the modulation order. For example, 2 bits in a DCI may indicate one from a group of four modulation techniques, that may include QPSK, 16QAM, 64QAM, 256QAM, and/or 1024QAM, if a UE to which the DCI is directed supports the four modulation techniques included in the group.

In accordance with aspects of the present disclosure, one or more bits (e.g., one bit) in DCI may indicate a modulation order adjustment from a modulation order (e.g., a default modulation order) indicated by the MCS index. The MCS index in a DCI may indicate both a TBS and a modulation order for a communication, according to current MCS table in 3GPP TS 36.213. One bit in the DCI may indicate whether the modulation order from an MCS table is used for the communication or if the modulation order from the MCS table is adjusted, and the adjusted modulation order is used for the communication. The adjustment can be an increase or a decrease. For each MCS in the MCS table, the MCS table or another table specifies whether an adjustment for that MCS is an increase or a decrease of the modulation order.

According to aspects of the present disclosure, techniques for determining a modulation order of a communication based on information, other than a transport block size (TBS) indicated in downlink control information (DCI) allocating resources for the communication, are provided.

In aspects of the present disclosure, techniques for indicating a modulation order of a communication with information, other than a transport block size (TBS) indicated in downlink control information (DCI) allocating resources for the communication, are provided.

Figure 9:
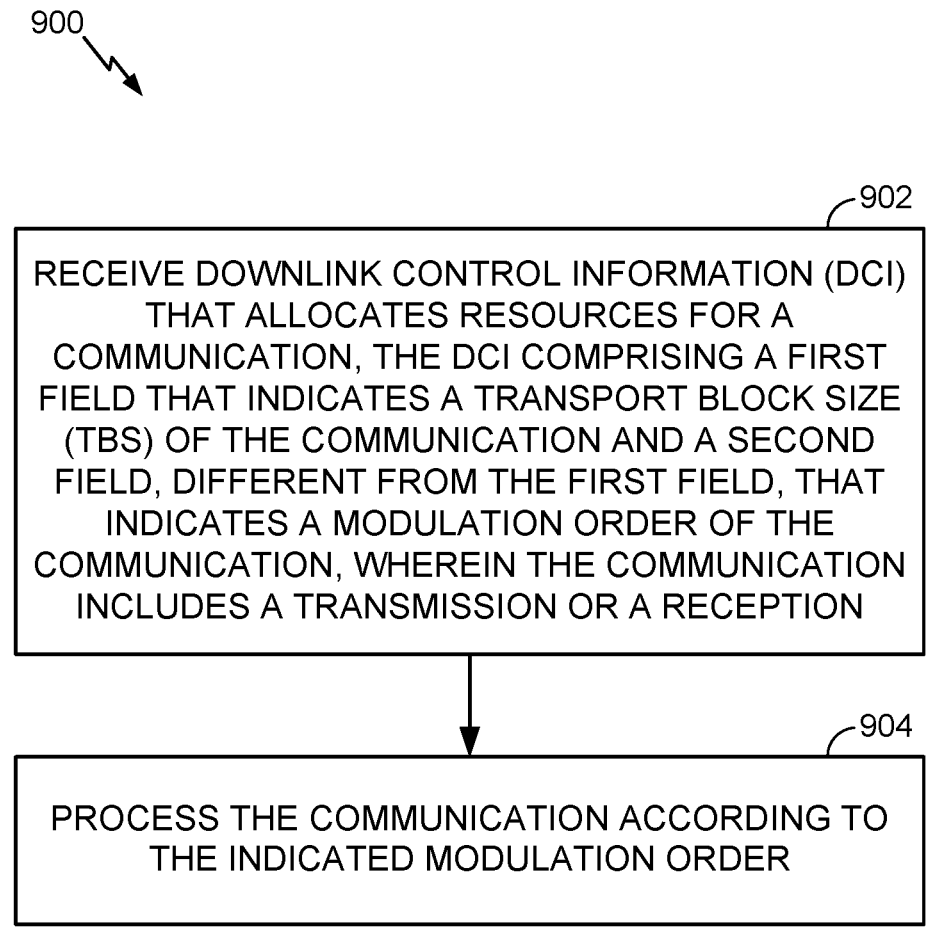
FIG. 9 illustrates exemplary operations that may be performed by a UE, in accordance with certain aspects of the present disclosure.

FIG. 9 illustrates exemplary operations that may be performed by a UE (e.g., UE 120f, shown in FIG. 1) to determine a modulation order of a communication, according to certain aspects of the present disclosure.

At block 902, the UE receives downlink control information (DCI) that allocates resources for a communication, the DCI including a first field that indicates a transport block size (TBS) of the communication and a second field, different from the first field, that indicates a modulation order of the communication, wherein the communication includes a transmission or reception. For example, UE 120f, shown in FIG. 1, receives DCI from BS 110a that allocates resources for a PDSCH from the BS to the UE. In the example, the DCI has a first field (e.g., an MCS index, $I_{MCS}$=8) that indicates a TBS of the PDSCH and a second field that indicates the PDSCH is transmitted using a modulation order of 4.

At block 904, the UE processes the communication according to the indicated modulation order. For example, the UE processes the PDSCH by demodulating the PDSCH using a modulation order of 4 (e.g., demodulating using a 16QAM technique), instead of 2 (e.g., QPSK) as in previously known techniques.

Figure 10:
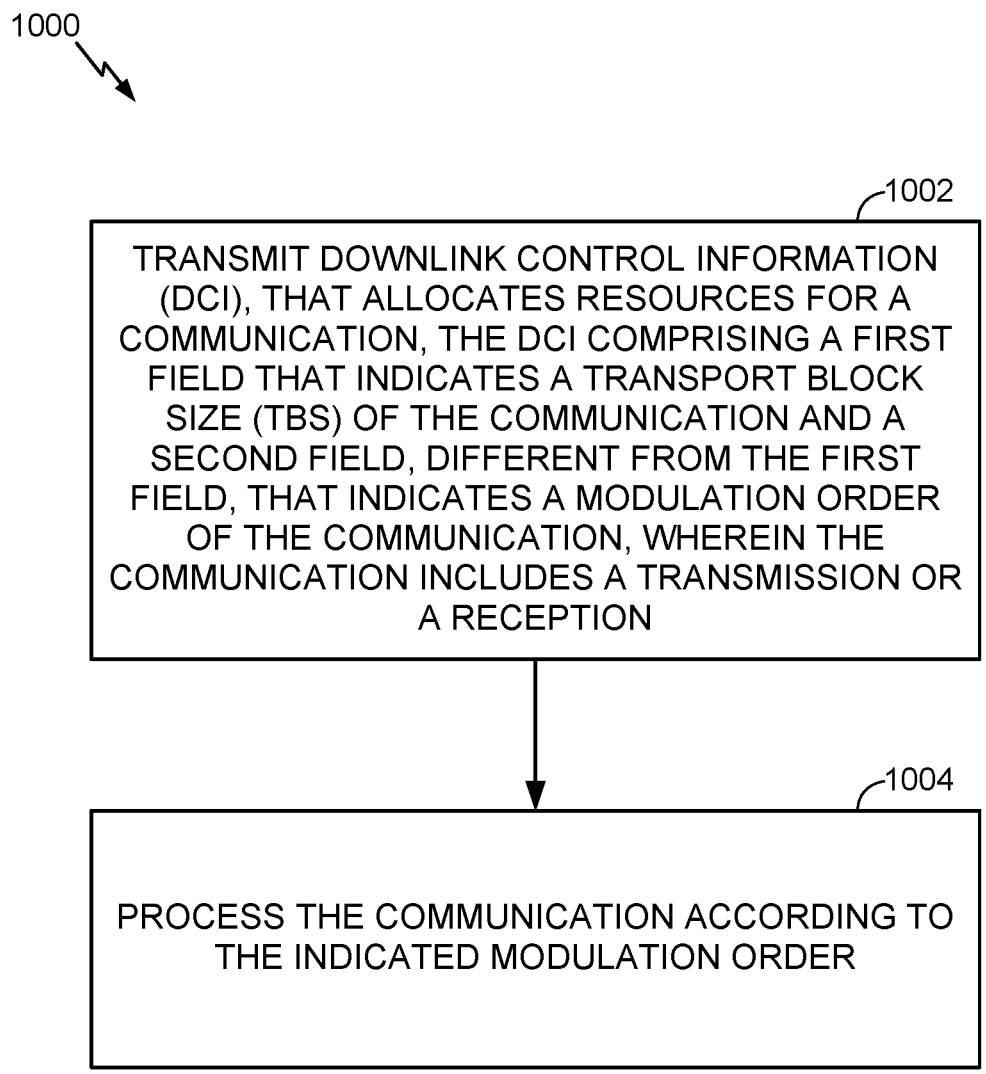
FIG. 10 illustrates exemplary operations that may be performed by a BS, in accordance with certain aspects of the present disclosure.

FIG. 10 illustrates exemplary operations 1000 that may be performed by a BS (e.g., BS 110a shown in FIG. 1) to indicate a modulation order of a communication, according to certain aspects of the present disclosure. Operations 1000 may be complementary to operations 900, shown in FIG. 9.

At block 1002, the BS transmits downlink control information (DCI) that allocates resources for a communication, the DCI including a first field that indicates a transport block size (TBS) of the communication and a second field, different from the first field, that indicates a modulation order of the communication, wherein the communication includes a transmission or reception. For example, BS 110a, shown in FIG. 1, transmits DCI that allocates resources for a PDSCH to UE 120f. In the example, the DCI includes a first field (e.g., an MCS index, $I_{MCS}$=8) that indicates a TBS of the PDSCH and a second field that indicates the PDSCH is transmitted using a modulation order of 4.

At block 1004, the BS processes the communication according to the indicated modulation order. For example, the BS processes the PDSCH by modulating the data of the PDSCH using a modulation order of 4 (e.g., a 16QAM modulation technique).

According to aspects of the present disclosure, a UE may indicate or report, to a base station (BS), a capability to determine the modulation order of the communication based on the second field (e.g., the second field of blocks 902 and 1002 in FIGS. 9-10, described above), and the UE may then receive, from the BS, a configuration that configures the UE to process the communication according to the indicated modulation order. That is, a UE may indicate to a BS that the UE is capable of determining modulation order of a communication based on transport block size and a second field of a DCI, and the BS may then configure (e.g., via an RRC communication) the UE to determine modulation order of a communication(s) based on the TBS and the second field of the DCI, instead of determining the modulation order based solely on the TBS (e.g., provided to the UE via an MCS index). In some cases, the configuration to determine modulation order based on TBS and the second field of the DCI may be different for different transmission modes. In some cases, the second (i.e., additional) field in the DCI may only be present in DCI transmitted over a UE-specific search space, and the second field may not be present in DCI transmitted over a common search space.

In aspects of the present disclosure, the second field may hold one of a plurality of (e.g., four) values, and each value may indicate a different modulation order, such as quadrature phase shift keying (QPSK), 16 quadrature amplitude modulation, (16QAM), 64 quadrature amplitude modulation (64QAM), 256 quadrature amplitude modulation (256QAM), or 1024 quadrature amplitude modulation (1024QAM).

According to aspects of the present disclosure, the first field may indicate a transport block size (e.g., a TBS index) and a default modulation order, and different values of the second field may indicate the default modulation order or an adjusted default modulation order. That is, the first field may indicate a default modulation order, and the second field may have one of two values, where the first value indicates to use the default modulation order, and the second value indicates to use an adjusted modulation order.

In aspects of the present disclosure, the first field may indicate whether the adjusted default modulation order is an increase from the default modulation order or a decrease from the default modulation order.

FIG. 11 illustrates an exemplary table 1100 of MCS indices 1102, modulation orders 1104, modulation order adjustments 1106, and TBS indices 1108. As in the previous table, a modulation order of 2 corresponds to the QPSK modulation technique, a modulation order of 4 corresponds to the 16QAM modulation technique, and a modulation order of 6 corresponds to the 64QAM technique. In the exemplary table 1100, a modulation order of 8 corresponds to the 256QAM technique. According to aspects of the present disclosure, a BS may include, in a DCI allocating resources for a communication (e.g., a downlink transmission or an uplink transmission), a first field including an MCS index that indicates a modulation and coding scheme for the communication, and a second field that indicates whether to use the modulation order corresponding to the MCS index, or an adjusted modulation order. If the second field indicates to use an adjusted modulation order, then the entry in the modulation order adjustments column corresponding to the MCS index indicates whether the adjusted modulation order is higher than the modulation order from column 1104 or lower than the modulator order from column 1104. For example, a BS (e.g., BS 110a in FIG. 1) may transmit DCI indicating an uplink transmission by a UE (e.g., UE 120f in FIG. 1) or a downlink transmission to the UE should be made, with the DCI indicating an MCS index of 13. In the example, the BS may set the second field to a value of "1", selected from the set of values {0, 1}. In the example, the UE receiving the DCI may identify (e.g., by referring to row 1110 of table 1100) the modulation order corresponding to the MCS index of 13 to be 6 (the entry in column 1104 for row 1110), which corresponds to the 64QAM modulation technique. The UE may then determine the value of the second field ("1") to indicate that the UE should use an adjusted modulation order. The UE may then determine (e.g., by referring to the entry in column 1106 for row 1110) that the modulation order adjustment to be used for an MCS index of 13 is "Decrease," and the UE may determine to use a modulation order of 4 (decreased from 6), corresponding to a 16QAM modulation technique. The UE may then transmit an uplink transmission or receive a downlink transmission using 16QAM modulation with a TBS corresponding to the TBS index of 18, which the UE determines by referring to the entry in column 1108 for row 1110.

According to aspects of the present disclosure, a UE (e.g., UE 120f in FIG. 1) may report, to a BS (e.g., BS 110a in FIG. 1), a capability to adjust the modulation order of the communication based on a second field (e.g., the second field of blocks 902 or 1002, described above with reference to FIGS. 9-10), and the UE may then receive, from the BS, a configuration that configures the UE to process the communication according to the indicated modulation order. That is, a UE may indicate to a BS that the UE is capable of adjusting modulation order of a communication based on a second (e.g., another) field of a DCI, and the BS may then configure (e.g., via a RRC communication) the UE to adjust modulation order based on the second field of the DCI, instead of determining the modulation order solely on the MCS index. In some cases, the configuration to determine modulation based on the second field of a DCI may be different for different transmission modes. In some cases, the second (e.g., additional or other) field in the DCI may only be present (i.e., included) in DCI transmitted over a UE-specific search space, and the second (e.g., additional or other) field may not be present (i.e., included) in DCI transmitted over a common search space.

According to aspects of the present disclosure, the communication in FIG. 9 may be an uplink (UL) transmission, and processing the communication may include transmitting the UL transmission using the indicated modulation order.

In aspects of the present disclosure, the communication in FIG. 10 may include reception of an uplink (UL) transmission, and processing the communication may include demodulating and/or decoding the UL transmission using the indicated modulation order.

According to aspects of the present disclosure, the communication in FIG. 9 may include reception of a downlink (DL) transmission, and processing the communication may include demodulating and/or decoding the DL transmission using the indicated modulation order.

According to aspects of the present disclosure, the communication in FIG. 10 may be a downlink (DL) transmission, and processing the communication may include transmitting the DL transmission using the indicated modulation order.

In aspects of the present disclosure, modulation order for a communication may be implicitly signaled and determined.

According to aspects of the present disclosure, in DCI allocating resources for a communication, a BS (e.g., BS 110a in FIG. 1) may include an indication of an MCS for the communication, which indicates a TBS. A UE (e.g., UE 120f in FIG. 1) receiving the DCI (and the communication) may implicitly determine a modulation order for the communication, based on a spectral efficiency (SE) of the communication. SE may be determined for a communication, based on a TBS and number of resource elements available in the allocation for the communication.

In aspects of the present disclosure, a set of SE thresholds and corresponding modulation orders for modulation order determination may be defined.

According to aspects of the present disclosure, a set of SE thresholds and corresponding modulation orders may be defined in a communications standard or specification.

In aspects of the present disclosure, a set of SE thresholds and corresponding modulation orders may be configured on a UE by signaling from the network. The signaling may, for example, be radio resource control (RRC) signaling or a system information block (SIB).

Figure 12:
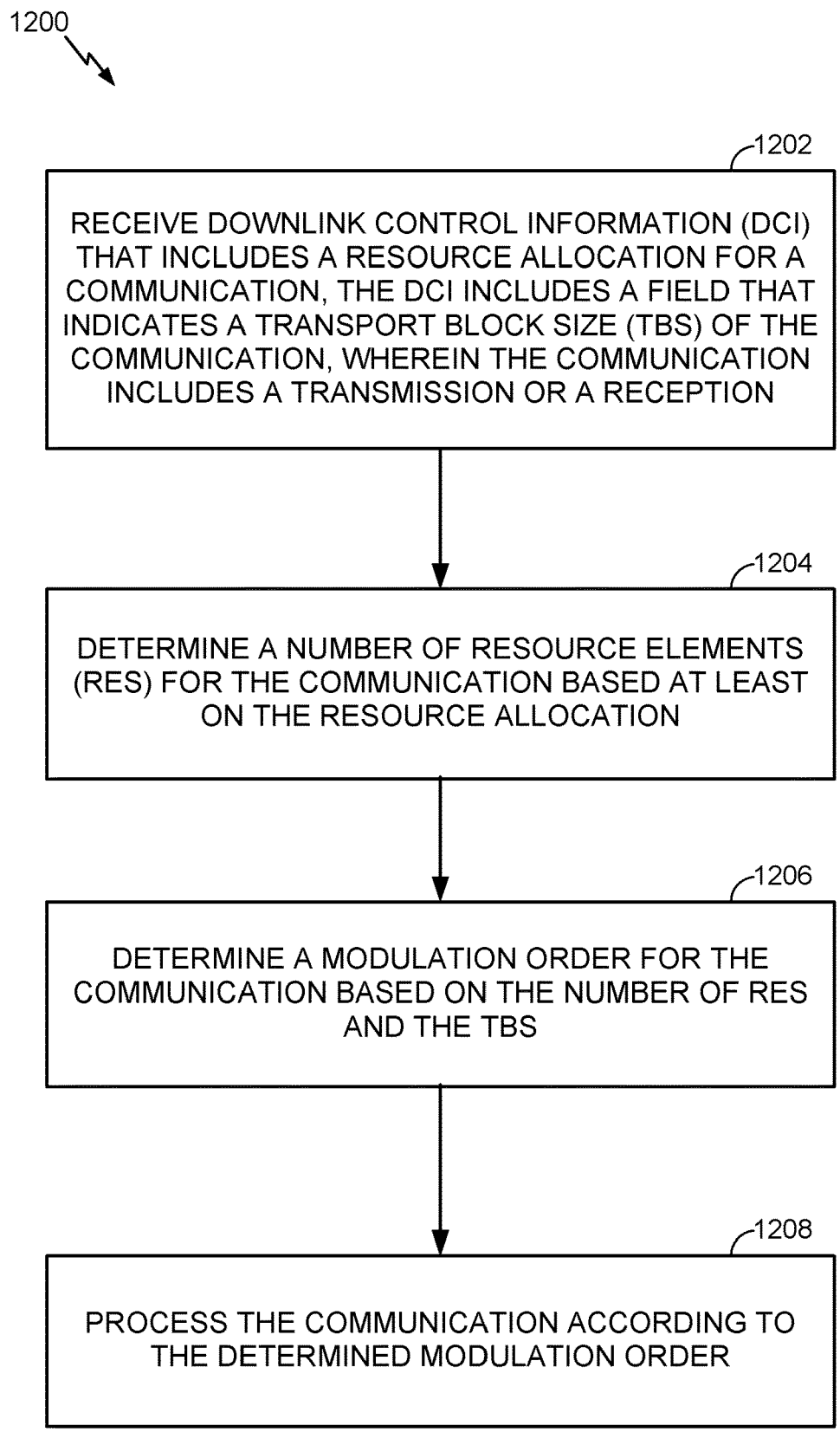
FIG. 12 illustrates exemplary operations that may be performed by a UE, in accordance with certain aspects of the present disclosure.

FIG. 12 illustrates exemplary operations 1200 that may be performed by a UE (e.g., UE 120a, shown in FIG. 1) to determine a modulation order of a communication, according to certain aspects of the present disclosure.

At block 1202, the UE receives downlink control information (DCI) that includes a resource allocation for a communication, the DCI including a field that indicates a transport block size (TBS) of the communication, wherein the communication includes a transmission or a reception. For example, UE 120a, shown in FIG. 1, receives DCI from BS 110 that includes a resource allocation for a PDSCH to the UE, and the DCI may include a field (e.g., an MCS index, $I_{MCS}$) that indicates a TBS of the PDSCH.

At block 1204, operations 1200 continue with the UE determining a number of resource elements (REs) for the communication based at least on the resource allocation. For example, the UE determines a number of REs for the PDSCH based on the resource allocation in the DCI.

Operations 1200 continue at block 1206 with the UE determining a modulation order for the communication based on the number of REs and the TBS. For example, the UE determines a modulation order for the PDSCH based on the number of REs from block 1204 and the TBS indicated by the field in block 1202.

At block 1208, the UE processes the communication according to the determined modulation order. For example, the UE processes the PDSCH by demodulating the PDSCH using a demodulation technique of the modulation order determined at block 1206.

Figure 13:
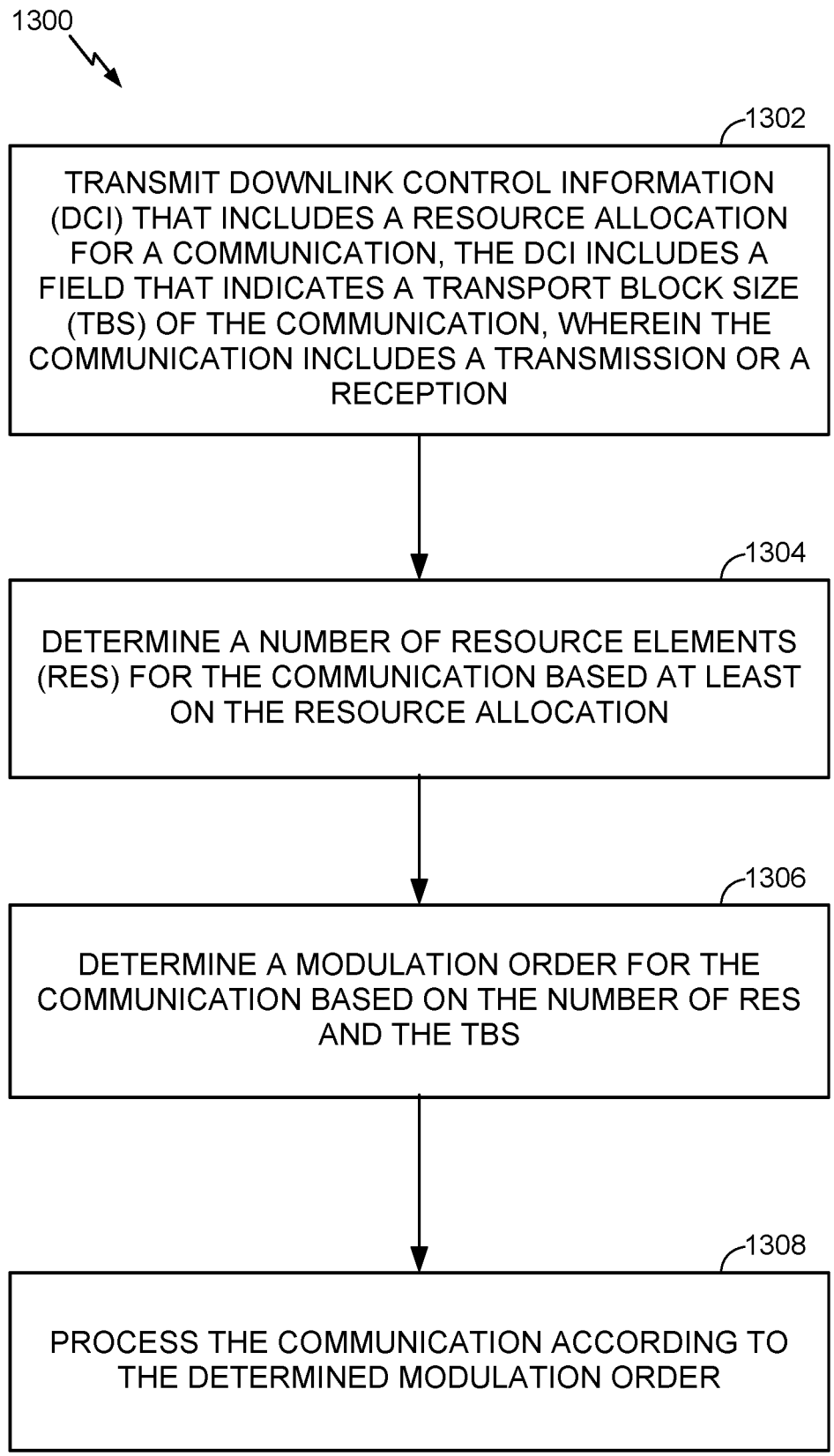
FIG. 13 illustrates exemplary operations that may be performed by a BS, in accordance with certain aspects of the present disclosure.

FIG. 13 illustrates exemplary operations 1300 that may be performed by a BS (e.g., BS 110a, shown in FIG. 1) to indicate a modulation order of a communication, according to certain aspects of the present disclosure. Operations 1300 may be complementary to operations 1200, shown in FIG. 12.

At block 1302, the BS transmits downlink control information (DCI) that includes a resource allocation for a communication, the DCI including a field that indicates a transport block size (TBS) of the communication, wherein the communication includes a transmission or a reception. For example, BS 110a, shown in FIG. 1, transmits DCI that includes a resource allocation for a PDSCH to a UE, and the DCI may include a field (e.g., an MCS index, $I_{MCS}$) that indicates a TBS of the PDSCH.

At block 1304, operations 1300 continue with the BS determining a number of resource elements (REs) for the communication based at least on the resource allocation. For example, the BS determines a number of REs for the PDSCH based at least on the resource allocation from block 1302.

Operations 1300 continue at block 1206 with the BS determining a modulation order for the communication based on the number of REs and the TBS. For example, the BS determines a modulation order for the PDSCH based on the number of REs from block 1304 and the TBS indicated at block 1302.

At block 1308, the BS processes the communication according to the determined modulation order. For example, the BS processes the PDSCH by modulating data of the PDSCH according to the determined modulation order in preparation for transmitting the PDSCH.

In aspects of the present disclosure, SE for a communication may be determined based on TBS for the communication and a number of data REs allocated for the communication. A UE receiving DCI allocating resources for a communication may determine a TBS for the communication based on an MCS indicated in the DCI and according to an MCS table. The UE may determine a number of cyclic redundancy check (CRC) bits to be added to the TBS, according to a channel coding procedure. For the allocated resources, the UE may determine a number of data REs in the allocation by excluding at least control symbols and resource elements used for other channels and/or signals (e.g., REs used for reference signals such as DMRS, CSI-RS, or CRS). The number of data REs for the spectral efficiency calculation may be the same as the number of data REs for rate matching purposes. Then, the SE may be calculated by this formula:

$$SE = (TBS + \text{number of CRC bits})/(\text{number of data REs in the allocation})$$

According to aspects of the present disclosure, an exemplary set of SE thresholds to modulation orders may be as follows:

If SE<1.1768 bits/RE, modulation is QPSK,
else if SE<2.5684 bits/RE, modulation is 16QAM,
else if SE<5.3349 bits/RE, modulation is 64QAM,
else, modulation is 256QAM.

In aspects of the present disclosure, the SE may be based on at least one of a number of cyclic redundancy check (CRC) bits of the communication, a number of control symbols of the communication, a number of reference signal tones, a cyclic prefix length, a beam index of the communication, a subcarrier spacing of the communication, numerology of the communication, presence of a sounding reference signal (SRS) in some REs, or a subframe format of a subframe in which the communication occurs.

According to aspects of the present disclosure, a UE or a BS may obtain the set of threshold SEs and corresponding potential modulation orders from a communications standard or specification.

In aspects of the present disclosure, a UE may obtain the set of threshold SEs and corresponding potential modulation orders from a radio resource control (RRC) transmission from a base station (BS).

According to aspects of the present disclosure, a UE may obtain the set of threshold SEs and corresponding potential modulation orders from a system information block (SIB) broadcast by a BS.

In aspects of the present disclosure, the communication in FIG. 12 may be an uplink (UL) transmission, and processing the communication may include transmitting the UL transmission using the indicated modulation order.

According to aspects of the present disclosure, the communication in FIG. 12 may be reception of a downlink (DL) transmission, and processing the communication may include demodulating and/or decoding the DL transmission using the indicated modulation order.

In aspects of the present disclosure, the communication in FIG. 13 may be a reception of an uplink (UL) transmission, and processing the communication may include demodulating and/or decoding the UL transmission using the indicated modulation order.

According to aspects of the present disclosure, the communication in FIG. 12 may be a downlink (DL) transmission, and processing the communication may include transmitting the DL transmission using the indicated modulation order.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for boosting, means for configuring, means for reducing, means for exiting, means for requesting, means for coordinating, means for performing, means for monitoring, means for searching, means for terminating, means for returning, means for instructing, and/or means for indicating may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may include a receive processor (e.g., the receive processor 258) and/or an antenna(s) 252 of the user terminal 120 illustrated in FIG. 2. Means for transmitting, and/or means for announcing, may include a transmit processor (e.g., the transmit processor 220) and/or an antenna(s) 234 of the eNB 110 illustrated in FIG. 2. Means for requesting and/or means for instructing may include a network interface, one or more processors, and/or a communications unit (e.g., communications unit 294 or communications unit 244).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   receiving downlink control information (DCI) that allocates resources for a communication, the DCI includes a first field that indicates a transport block size (TBS) of the communication and a second field, different from the first field, that indicates a modulation order of the communication, wherein the communication includes a transmission or a reception wherein the first field indicates a default modulation order, wherein different values of the second field indicate the default modulation order or an adjusted default modulation order, and wherein the first field indicates whether the adjusted default modulation order is an increase from the default modulation order or a decrease from the default modulation order;
   indicating, to a base station (BS), a capability to determine the modulation order of the communication based on the second field;
   receiving, from the BS, a configuration that configures the UE to process the communication according to the indicated modulation order; and
   processing the communication according to the indicated modulation order.

2. The method of claim 1, wherein:
   the modulation order is selected from a group of potential modulation orders including at least one of:
      quadrature phase shift keying (QPSK),
      16 quadrature amplitude modulation (16QAM),
      64 quadrature amplitude modulation (64QAM),
      256 quadrature amplitude modulation (256QAM), or
      1024 quadrature amplitude modulation (1024QAM).

3. The method of claim 1, wherein:
   the communication is an uplink (UL) transmission, and
   processing the communication comprises transmitting the UL transmission using the indicated modulation order.

4. The method of claim 1, wherein:
   the communication is reception of a downlink (DL) transmission, and
   processing the communication comprises decoding the DL transmission using the indicated modulation order.

5. A method for wireless communications by a base station, comprising:
   transmitting downlink control information (DCI), that allocates resources for a communication, the DCI includes a first field that indicates a transport block size (TBS) of the communication and a second field, different from the first field, that indicates a modulation order of the communication, wherein the communication includes a transmission or a reception, wherein the first field indicates a default modulation order, wherein different values of the second field indicate the default modulation order or an adjusted default modulation order, and wherein the first field indicates whether the adjusted default modulation order is an increase from the default modulation order or a decrease from the default modulation order;
   processing the communication according to the indicated modulation order;
   obtaining, from a user equipment (UE), a capability of the UE to determine the modulation order of the communication based on the second field; and
   transmitting, to the UE, a configuration that configures the UE to process the communication according to the indicated modulation order.

6. The method of claim 5, wherein:
   the modulation order is selected from a group of potential modulation orders including at least one of:
      quadrature phase shift keying (QPSK),
      16 quadrature amplitude modulation (16QAM),
      64 quadrature amplitude modulation (64QAM),
      256 quadrature amplitude modulation (256QAM), or
      1024 quadrature amplitude modulation (1024QAM).

7. The method of claim 5, wherein:
   the communication is reception of an uplink (UL) transmission, and
   processing the communication comprises decoding the UL transmission using the indicated modulation order.

8. The method of claim 5, wherein:
   the communication is a downlink (DL) transmission, and
   processing the communication comprises transmitting the DL transmission using the indicated modulation order.

9. A method for wireless communications by a user equipment (UE), comprising:
   receiving downlink control information (DCI) that includes a resource allocation for a communication, the DCI includes a field that indicates a transport block size (TBS) of the communication, wherein the communication includes a transmission or a reception;
   determining a number of resource elements (REs) for the communication based at least on the resource allocation;
   determining a modulation order for the communication comprising:
      determining a spectral efficiency (SE) for the communication based at least on the TBS and the number of REs, wherein determining the SE is further based on at least one of a number of reference signal tones, a cyclic prefix length, a beam index of the communication, or a subframe format of a subframe in which the communication occurs; and
      determining the modulation order based on the SE; and
   processing the communication according to the determined modulation order.

10. The method of claim 9, wherein determining the modulation order comprises:
    determining the modulation order as a potential modulation order corresponding to a largest threshold SE, from a set of threshold SEs that each correspond to a potential modulation order, that the SE for the communication is less than or equal to.

11. The method of claim 10, further comprising:
obtaining the set of threshold SEs and corresponding potential modulation orders from at least one of:
a network standard,
a radio resource control (RRC) transmission from a base station (BS), or
a system information block (SIB).

12. The method of claim 9, wherein determining the modulation order comprises determining the modulation order as a potential modulation order corresponding to an SE threshold satisfied by the determined SE.

13. The method of claim 9, wherein:
the communication is an uplink (UL) transmission, and
processing the communication comprises transmitting the UL transmission using the indicated modulation order.

14. The method of claim 9, wherein:
the communication is reception of a downlink (DL) transmission, and
processing the communication comprises decoding the DL transmission using the indicated modulation order.

15. A method for wireless communications by a base station (BS), comprising:
transmitting a downlink control information (DCI) that includes a resource allocation for a communication, the DCI includes a field that indicates a transport block size (TBS) of the communication, wherein the communication includes a transmission or a reception; and
determining a number of resource elements (REs) for the communication based at least on the resource allocation;
determining a modulation order for the communication comprising:
determining a spectral efficiency (SE) for the communication based at least on the TBS and the number of REs, wherein determining the SE is further based on at least one of a number of reference signal tones, a cyclic prefix length, a beam index of the communication, or a subframe format of a subframe in which the communication occurs; and
determining the modulation order based on the SE; and
processing the communication according to the determined modulation order.

16. The method of claim 15, wherein determining the modulation order comprises:
determining the modulation order as a potential modulation order corresponding to a largest threshold SE, from a set of threshold SEs that each correspond to a potential modulation order, that the SE for the communication is less than or equal to.

17. The method of claim 16, further comprising:
obtaining the set of threshold SEs and corresponding potential modulation orders from a network standard.

18. The method of claim 16, further comprising:
transmitting an indication of the set of threshold SEs and corresponding potential modulation orders in at least one of a radio resource control (RRC) transmission or a system information block (SIB).

19. The method of claim 15, wherein determining the modulation order comprises determining the modulation order as a potential modulation order corresponding to an SE threshold satisfied by the determined SE.

20. The method of claim 15, wherein:
the communication is reception of an uplink (UL) transmission, and
processing the communication comprises decoding the UL transmission using the indicated modulation order.

21. The method of claim 15, wherein:
the communication is a downlink (DL) transmission, and
processing the communication comprises transmitting the DL transmission using the indicated modulation order.

* * * * *